(12) United States Patent
Park (10) Patent No.: US 8,077,014 B2
(45) Date of Patent: Dec. 13, 2011

(54) METHOD, APPARATUS, AND SYSTEM FOR RADIO FREQUENCY IDENTIFICATION (RFID) TAG ASSOCIATION AND RELATIVE POSITIONING

(75) Inventor: Daniel Lewis Park, Mukilteo, WA (US)

(73) Assignee: Intermec IP Corp., Everett, WA (US)

( * ) Notice: Subject to any disclaimer, the term of this patent is extended or adjusted under 35 U.S.C. 154(b) by 1001 days.

(21) Appl. No.: 12/015,832

(22) Filed: Jan. 17, 2008

(65) Prior Publication Data

US 2009/0184802 A1 Jul. 23, 2009

(51) Int. Cl.
*H04Q 5/22* (2006.01)
*G08B 13/14* (2006.01)

(52) U.S. Cl. .............. 340/10.41; 340/572.1; 340/10.1; 340/10.32

(58) Field of Classification Search ............... 340/572.1, 340/10.1, 10.32, 10.41
See application file for complete search history.

(56) References Cited

U.S. PATENT DOCUMENTS

| | | | | |
|---|---|---|---|---|
| 5,565,858 A * | 10/1996 | Guthrie | ...... | 340/10.33 |
| 5,959,568 A * | 9/1999 | Woolley | ...... | 342/42 |
| 7,271,727 B2 * | 9/2007 | Steeves | ...... | 340/572.7 |
| 7,274,294 B2 * | 9/2007 | Heinze et al. | ...... | 340/572.1 |
| 2005/0093703 A1 * | 5/2005 | Twitchell, Jr. | ...... | 340/572.8 |
| 2006/0181420 A1 * | 8/2006 | Ishii | ...... | 340/572.1 |
| 2007/0001809 A1 | 1/2007 | Kodukula et al. | | |
| 2007/0008150 A1 * | 1/2007 | Hassell | ...... | 340/573.1 |
| 2007/0103303 A1 * | 5/2007 | Shoarinejad | ...... | 340/572.1 |
| 2008/0079542 A1 * | 4/2008 | Rofougaran | ...... | 340/10.1 |

* cited by examiner

*Primary Examiner* — Jennifer Mehmood
*Assistant Examiner* — Andrew Bee
(74) *Attorney, Agent, or Firm* — Seed IP Law Group PLLC (57) ABSTRACT

Obscured radio frequency identification (RFID) tags are indirectly read by an RFID reader. Other tags operate to relay the information associated with the obscured tags from one tag to another, until the associated information is ultimately received by the RFID reader from a tag in direct communication with the RFID reader. The tags may be adapted to store the received information associated with the obscured tags and then to encode this associated information and resident information in return signal(s) transmitted to the RFID reader and/or to other tag(s). The RFID reader is adapted to decode the received return signals to obtain the information encoded therein, and to process the decoded information to identify irrelevant tags and obscured tags.

20 Claims, 7 Drawing Sheets

METHOD, APPARATUS, AND SYSTEM FOR RADIO FREQUENCY IDENTIFICATION (RFID) TAG ASSOCIATION AND RELATIVE POSITIONING

TECHNICAL FIELD

This disclosure generally relates to the field of automatic data collection (ADC), for example, data acquisition via radio frequency identification (RFID) tags. More particularly but not exclusively, the present disclosure relates to reading RFID tags in certain environments where some of the RFID tags are obscured from the field of view of an RFID reader and/or where some irrelevant RFID tags are read.

BACKGROUND INFORMATION

The ADC field includes a variety of different types of ADC data carriers and ADC readers operable to read data encoded in such data carriers. For example, data may be encoded in machine-readable symbols, such as barcode symbols, area or matrix code symbols, and/or stack code symbols. Machine-readable symbols readers may employ a scanner and/or imager to capture the data encoded in the optical pattern of such machine-readable symbols. Other types of data carriers and associated readers exist, for example magnetic stripes, optical memory tags, and touch memories.

Other types of ADC carriers include RFID tags that may store data in a wirelessly accessible memory, and may include a discrete power source (i.e., an active RFID tag), or may rely on power derived from an interrogation signal (i.e., a passive RFID tag). RFID readers typically emit a radio frequency (RF) interrogation signal that causes the RFID tag to respond with a return RF signal encoding the data stored in the memory.

Identification of an RFID device or tag generally depends on RF energy produced by a reader or interrogator arriving at the RFID tag and returning to the reader. Multiple protocols exist for use with RFID tags. These protocols may specify, among other things, particular frequency ranges, frequency channels, modulation schemes, security schemes, and data formats.

Many ADC systems that use RFID tags employ an RFID reader in communication with one or more host computing systems that act as central depositories to store and/or process and/or share data collected by the RFID reader. In many applications, wireless communications is provided between the RFID reader and the host computing system. Wireless communications allow the RFID reader to be mobile, may lower the cost associated with installation of an ADC system, and permit flexibility in reorganizing a facility, for example a warehouse.

RFID tags typically include a semiconductor device (such as a chip) having the memory, circuitry, and one or more conductive traces that form an antenna. Typically, RFID tags act as transponders, providing information stored in the memory in response to the RF interrogation signal received at the antenna from the reader or other interrogator. Some RFID tags include security measures, such as passwords and/or encryption. Many RFID tags also permit information to be written or stored in the memory via an RF signal.

The read/write range and read/write quality of an RFID tag is often strongly dependent on the type of material composition of the object on which RFID tag is attached and/or on the type of material that is proximate to the RFID tag. As an illustration, a number of objects each with their own attached RFID tag may be present in or otherwise arranged in a pallet. When an RFID reader attempts to read these RFID tags, the RFID reader may successfully read some RFID tags, may read the data of some RFID tags incorrectly, and may not be able to read some RFID tags at all. For instance, the material composition and/or position of certain objects and/or parts of the pallet may block the interrogation signal being sent from the RFID reader, thereby preventing the interrogation signal from reaching some of the RFID tags. Further, the material composition and/or position of certain objects and/or parts of the pallet may block or distort or otherwise interfere with the quality of the return signal sent by RFID tags that did successfully receive the interrogation signal, thereby resulting in erroneous information received by the RFID reader.

Other problems can arise when two or more of such pallets are positioned proximate to each other. Thus, when a user attempts to use the RFID reader to read the RFID tags located in a first pallet, the RFID reader may inadvertently also read the RFID tags located in a second pallet positioned near the first pallet. This result may be undesirable, for example, if the user is intending to accurately read the RFID tags in only the first pallet.

The above-discussed problems can be compounded if, for example, the RFID reader has poor focusing capability and/or if the user of the RFID reader is not particularly skilled in properly aiming the RFID reader to read target RFID tags. Accordingly, return signals from RFID tags that are not of interest may be received, the RFID tags of interest may not properly receive the interrogation signal, etc.

BRIEF SUMMARY

One aspect provides a radio frequency identification (RFID) system that includes: an RFID reader adapted to provide an interrogation signal; and a plurality of RFID tags, at least a first of said RFID tags being positioned to receive said interrogation signal and being adapted to provide at least one first return signal in response to said interrogation signal, at least a second of said RFID tags being adapted to provide a second return signal, said second return signal being encoded with information, associated with said second RFID tag, that is provided to said first RFID tag, said at least one first return signal provided by said first RFID tag being encoded with information resident in said first RFID tag and with said provided information associated with said second RFID tag, wherein said RFID reader is adapted to decode said first return signal to obtain the resident information and associated information encoded therein, and adapted to process said decoded information to identify said second RFID tag as being positioned in indirect communication with said RFID reader.

One aspect provides a radio frequency identification (RFID) reader apparatus that includes an antenna and transceiver circuitry adapted to provide an interrogation signal to at least some of a plurality of RFID tags and adapted to receive respective return signals from responsive ones of said RFID tags, at least one of said return signals from each responsive RFID tag being encoded with first information pertaining to the respective responsive RFID tag and second information associated with at least one other responsive RFID tag; a decoder coupled to said transceiver circuitry to said decode said first information and said second information from each at least one return signal; and a processor coupled to said decoder to process said decoded first information and said decoded second information to determine which of said plurality of RFID tags provided their respective at least one return signal directly to said antenna and which of said plurality of RFID tags provided their respective at least one return signal indirectly to said antenna via at least one other RFID tag.

One aspect provides a method for a radio frequency identification (RFID) tag that includes: storing first information in said RFID tag, said first information pertaining to said RFID tag; receiving by said RFID tag second information associated with another RFID tag that is unable to communicate said second information directly to an RFID reader; encoding said first information and said second information in at least one return signal; and transmitting said at least one return signal having said first information and said second information encoded therein in response to an interrogation signal from said RFID reader.

One aspect provides a method for a radio frequency identification (RFID) reader that includes: providing an interrogation signal to at least some of a plurality of RFID tags; in response to said provided interrogation signal, receiving respective return signals from energized ones of said RFID tags, at least one of said return signals from each energized RFID tag being encoded with first information pertaining to the respective energized RFID tag and second information associated with at least one other energized RFID tag; decoding said first information and said second information from each at least one return signal; and processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag.

One aspect provides an article of manufacture that includes a computer-readable medium, of a radio frequency identification (RFID) reader, encoded with computer-readable instructions that are executable by a processor of said RFID reader to communicate with a plurality of RFID tags, by: providing an interrogation signal to at least some of said plurality of RFID tags; in response to said provided interrogation signal, receiving respective return signals from energized ones of said RFID tags, at least one of said return signals from each energized RFID tag being encoded with first information pertaining to the respective energized RFID tag and second information associated with at least one other energized RFID tag; decoding said first information and said second information from each at least one return signal; and processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag.

One aspect provides a radio frequency identification (RFID) tag that includes: means for storing first information in said RFID tag, said first information pertaining to said RFID tag; means for receiving by said RFID tag second information associated with another RFID tag that is unable to communicate said second information directly to an RFID reader; means for encoding said first information and said second information in at least one return signal; and means for transmitting said at least one return signal having said first information and said second information encoded therein in response to an interrogation signal from said RFID reader.

One aspect provides an article of manufacture that includes a computer-readable medium, of a radio frequency identification (RFID) tag, encoded with computer-readable instructions that are executable by a processor of said RFID tag to communicate with an RFID reader and/or with at least one other RFID tag, by: storing first information in said RFID tag, said first information pertaining to said RFID tag; receiving by said RFID tag second information associated with another RFID tag that is unable to communicate said second information directly to said RFID reader; encoding said first information and said second information in at least one return signal; and transmitting said at least one return signal having said first information and said second information encoded therein in response to an interrogation signal from said RFID reader.

One aspect provides a radio frequency identification (RFID) reader that includes: means for providing an interrogation signal to at least some of a plurality of RFID tags; means for receiving respective return signals from energized ones of said RFID tags, in response to said provided interrogation signal, at least one of said return signals from each energized RFID tag being encoded with first information pertaining to the respective energized RFID tag and second information associated with at least one other energized RFID tag; means for decoding said first information and said second information from each at least one return signal; and means for processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag.

BRIEF DESCRIPTION OF THE SEVERAL VIEWS OF THE DRAWINGS

Non-limiting and non-exhaustive embodiments are described with reference to the following drawings, wherein like reference numerals refer to like parts throughout the various views unless otherwise specified. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION

In the following description, numerous specific details are given to provide a thorough understanding of embodiments.

The embodiments can be practiced without one or more of the specific details, or with other methods, components, materials, etc. In other instances, well-known structures, materials, or operations associated with RFID tags and RFID readers, computer and/or telecommunications networks, and/or computing systems are not shown or described in detail to avoid obscuring aspects of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure, or characteristic described in connection with the embodiment is included in at least one embodiment. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Reference throughout this specification and claims to "radio frequency" or RF includes wireless transmission of electromagnetic energy, including, but not limited to, energy with frequencies or wavelengths typically classed as falling in the radio and microwave portions of the electromagnetic spectrum.

The headings provided herein are for convenience only and do not interpret the scope or meaning of the embodiments.

As an overview, an embodiment provides a technique to enable obscured RFID tags to be indirectly read by an RFID reader. For instance for a plurality of RFID tags that need to be read by the RFID reader, wherein some of the tags are obscured or otherwise not in the direct field of view (including range) of the RFID reader in a manner that the RFID reader cannot directly receive the return signals of these obscured tags, the other ones of the tags can receive the return signals of these obscured tags. The information encoded in the received return signals can then be transmitted by these other tags directly to the RFID reader and/or to yet other tags until the RFID reader ultimately receives the information. In effect, the tags operate to relay or otherwise convey information from one tag to another, so that obscured tags can eventually be indirectly read by the RFID reader via other tags.

In one embodiment, the RFID tags are adapted to store the received information associated with the obscured tags (referred to herein as "associated information" or "associative information" or similar terminology) and then to transmit this associated information along with the information (different from the associated information) that actually pertains to the transmitting tag (such as an identification code of the transmitting tag, tag data stored by the transmitting tag, or other information residing in the transmitting tag). In another embodiment, the RFID tags need not necessarily perform this intermediate storage of the associated information. That is, the RFID tag can relay the received associative information to another destination without having to store the received associative information. In this regard, such RFID tag(s) can somewhat be considered as "reflecting" the received information to another destination.

In one embodiment, the RFID reader is adapted to decode the received return signals to obtain the information encoded therein, process the decoded information to filter duplicates and to identify which of the information is associative information and which of the information is resident information that pertains to tags that were directly read, and to identify possibly irrelevant information (such as information of tags that were not intended to be read).

Based on the results of the interrogation, a user of the RFID reader can determine a next course of action, such as to repeat the interrogation to obtain the information of tags that may have been obscured.

Figure 1:
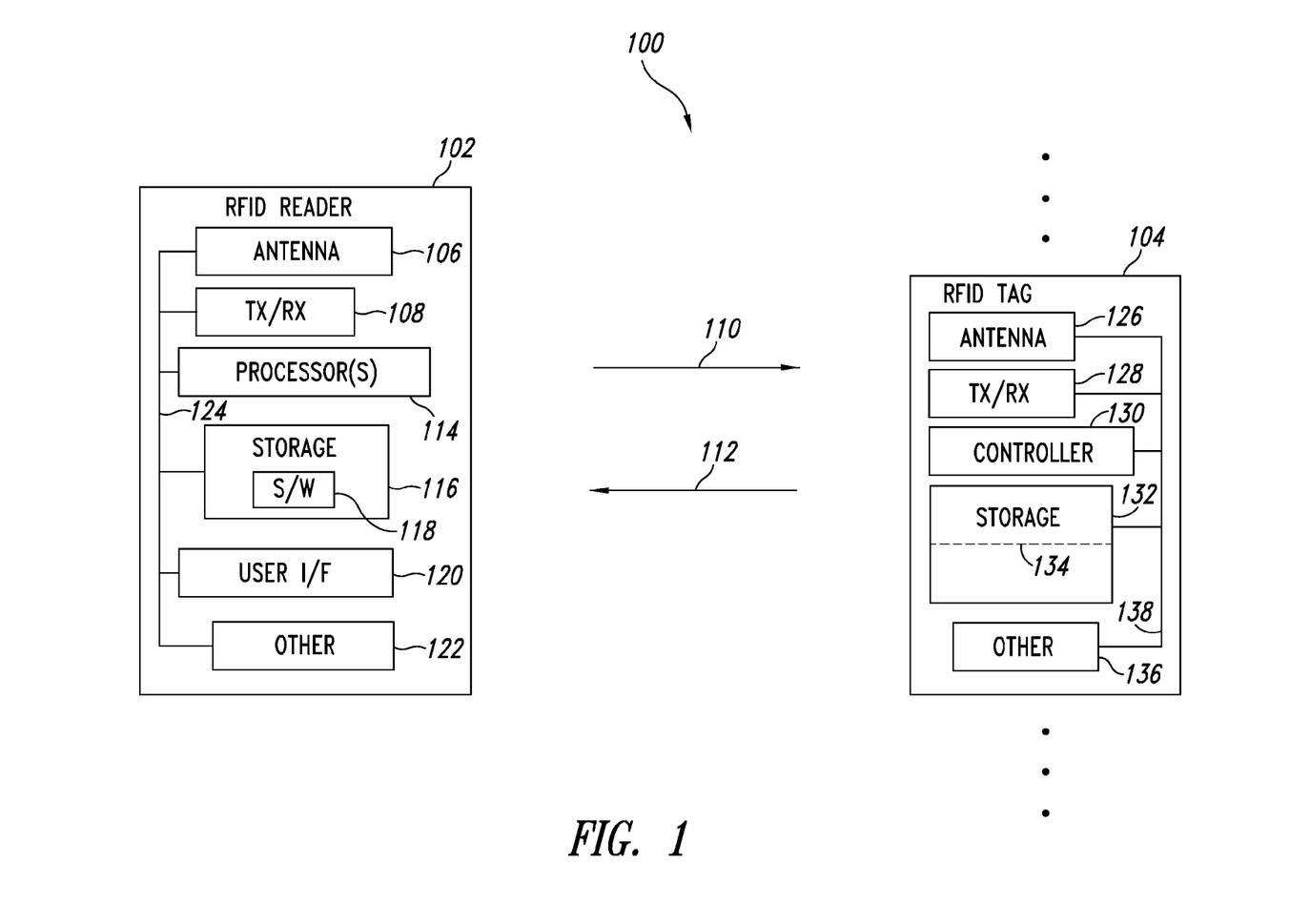
FIG. 1 shows block diagrams of one embodiment of an RFID reader and one embodiment of at least one RFID tag.

FIG. 1 shows an embodiment an automatic data collection device in the form of an RFID reader 102 having capability to read one or more RFID tags 104. For simplicity of explanation hereinafter, the RFID reader 102 will be described in the context of being a portable handheld automatic data collection device that is dedicated to reading RFID tags 104. In other embodiments, the automatic data collection device can be a stationary (non-portable) or semi-stationary device (such as attached to a forklift), and/or can be a multi-mode device having the capability to read other types of data carriers (e.g., bar code symbols, image code symbols, etc.) in addition to reading RFID tags.

One embodiment of the RFID reader 102 includes an antenna 106 and related transmitter/receiver ("transceiver") circuitry 108. The antenna 106 and transmitter/receiver circuitry 108 are adapted to send one or more interrogation signals 110 to the RFID tag 104, and are adapted to receive one or more return signals 112 sent by the RFID tag 104.

The RFID reader 102 includes one or more processors 114. The processor 114 is adapted to process the return signals 112 received by the RFID reader 102, as well as to control the operation of various other components of the RFID reader 102. In one embodiment that will be explained later below, the processor 114 is adapted to interpret the RFID information contained in the return signals 112, to identify which RFID tags 104 have been read, to filter out duplicate RFID information provided by the return signals 112, to determine which RFID information provided by the return signal 112 is relevant and irrelevant, to determine whether to notify a user of the RFID reader to repeat a reading operation or perform other action, and so forth.

In one embodiment, the RFID reader 102 includes a computer-readable storage medium 116 encoded with or otherwise storing instructions. The storage medium 116 can include, for example, one or more memories such as random access memory (RAM), read only memory (ROM), or other type of memory. The instructions stored in the storage medium 116 can include a computer program in the form of software or firmware, for example. For the sake of illustration, the instructions stored in the storage medium 116 are depicted in FIG. 1 as software 118. In one embodiment, the software 118 is executable by the processor 114 to perform the various operations described herein pertaining to reading the RFID tag 104, interpreting the results of the reading, and others.

The RFID reader 102 of one embodiment further includes a user interface 120. The user interface 120 is adapted to receive user commands pertaining to controlling the operation of the RFID reader 102, such as a command to send the interrogation signal 110. The user interface 120 is also adapted to present results of the read operation to the user (such as via a display screen), or to otherwise present audio and/or visual indicators to the user related to the operation of the RFID reader 102.

The RFID reader 102 includes other components 122 to support operation of the RFID reader 102. Such components can include, for example, a power source (such as a battery), communication components to enable the RFID reader to communicate with an external network/system (such as to download/upload data and software updates), a decoder to decode information encoded in received return signals 112, additional memory and/or processors, scanning and/or imaging components if the RFID reader 102 is a multi-mode data collection device, AC plug, and so forth.

A bus 124 (e.g., instruction, data, power buses) couples the various components of the RFID reader 102 together.

One embodiment of the RFID tag 104 includes an antenna 126 and related transmitter/receiver circuitry 128. The antenna 126 and transmitter/receiver circuitry 128 are adapted to receive the interrogation signals 110 from the RFID reader 122, and are adapted to send one or more return signals 112 to the RFID reader 102. In one embodiment that will be described later below, the antenna 126 and transmitter/receiver circuitry 128 are also adapted to receive return signals 112 from other RFID tags 104, and are adapted to send one or more return signals 112 to other RFID tags 104. Receiving return signals 112 from other RFID tags enables the RFID tag 104 to store the information encoded in said return signals 112, and then relay or otherwise send such stored information to the RFID reader 102 and/or to other RFID tags as return signals. In other embodiments, this relay of information need not involve the intermediate storage of the information.

In yet another embodiment, the transmitter/receiver circuitry 128 is also adapted to provide power to energize proximate RFID tags, such as via a separate signal to be received by the transmitter/receiver circuitry 128 of these other RFID tags and/or via the return signal 112 that is to be received by the transmitter/receiver circuitry 128 of these other RFID tags.

One embodiment of the RFID tag 104 includes one or more controllers 130. The controller 130 is adapted to process the interrogation signal 110 (and/or return signals 112 sent from other RFID tags) received by the RFID tag 104, as well as to control the operation of various other components of the RFID tag 104. For example, the controller 130 can be adapted to decode the information encoded in received return signals 112, and store the decoded information in one or more storage units 132. Further, the controller 130 can also be adapted to retrieve information stored in the storage unit(s) 132, and then encode the retrieved information into a return signal to be sent by the antenna 126 and transmitter/receiver circuitry 128 to the RFID reader 102 and/or to other RFID tags, add flags or other annotations to such information, and/or perform other operations.

Examples of the controller 130 can include, but not be limited to, a field programmable gate array (FPGA), application specific integrated circuit (ASIC), microprocessor, digital signal processor (DSP), or other suitable device.

In one embodiment, the storage unit 132 can be volatile and/or non-volatile memory or other computer-readable storage medium, and adapted to store various types information such as an identification (ID) code of the RFID tag 104, "tag data" that includes information resident in the RFID tag 104 and pertains to that particular RFID tag 104 (e.g., product information, manufacturer, price, etc. associated with an object on which the particular RFID tag 104 is attached), received ID codes of other RFID tags, and/or received tag data of other RFID tags. The storage unit 132 can be adapted to store other types of information as well. Examples of the storage unit 132 can include but not be limited to read only memory (ROM), random access memory (RAM), or other types of memory.

The storage unit 132 can be a single storage unit having different storage areas to store the various types of information identified above. Alternatively or additionally, more than one storage unit 132 can be provided in the RFID tag 104, with each storage unit 132 being adapted to store a different type of information and/or being used for extra storage capacity. A broken line 134 depicted in FIG. 1 symbolically represents that the storage unit 132 can include multiple storage areas and/or represents that multiple storage units 132 may be present.

The RFID tag 104 can include other components 136 to support operation of the RFID tag 104. For example, if the RFID tag 104 is an active RFID tag, the components 136 can include a discrete power supply. In the remainder of this description, the RFID tag 104 will be discussed in the context of being a passive RFID tag, such that power is obtained from the interrogation signal 110 and/or from other received signals, rather than being provided by a discrete power supply. In some embodiments where the components 104 includes a discrete power supply (thereby making the RFID tag 104 an active RFID tag), the various capabilities described herein to send information to and receive information from other RFID tags can still be provided.

The other components 136 can also include a decoder to decode information encoded in received signals, an encoder to encode information to be sent in a response signal 112, encryption/decryption elements, and/or other elements usable in connection with storing, transmitting, receiving, or processing information such as tag data, ID codes, and the like.

A bus 138 (e.g., instruction, data, power buses) couples the various components of the RFID tag 104 together.

Operation of the RFID reader 102 and the RFID tags 104 according to various embodiments will now be described first with respect to an environment shown in FIG. 2. Specifically in FIG. 2, a plurality of pallets 200 and 202 each hold a plurality of objects 206. It is understood that the pallets 200 and 202 are described merely for illustrative purposes herein. Other types of structures may be provided to hold the plurality of objects 206, such as a shipping container, inventory shelves, cart, warehouse, forklift, and/or any other type of structure that may be portable or fixed/stationary.

Each object 206 has an RFID tag (such as the RFID tag 104 depicted in FIG. 1) affixed thereon. The objects 206 can include packages, canisters, wrappers, or other types of containers to hold various items (e.g., food, merchandise, and the like) and/or the objects 206 can be the items themselves having tags affixed thereto, without necessarily being held in a dedicated container. In FIG. 2, the various RFID tags 104 are numbered 1-17 for illustrative purposes.

The pallet 202 may be located proximate to the pallet 200, and the pallets 200 and 202 may be similarly constructed and may be made of similar materials (e.g., wood, metal, plastic, etc.). The objects 206 are arranged in the pallets 200 and 202 such that some RFID tags may be blocked from the direct field of view of the RFID reader 102 by other objects and/or by certain structural portions of the pallet 200/202.

For example and with respect to the pallet 200, the positions and/or composition of objects having tags 1, 2, and 6 may completely prevent tag 5 from receiving the interrogation signal 110 from the RFID reader 102. Such may be the case, for instance, if the object having tags 1, 2, and 6 are made of metal or contain water (e.g., contain bottles of water). Further, tag 7 may be completely prevented from receiving the interrogation signal 110 due to the position/content of the objects having tags 1, 2, 4, 5, 6, and 10 attached thereon. Alternatively or additionally, a position/content of a portion 208 of the pallet 200 may at least partially block or attenuate the interrogation signal 110.

Under some circumstances, tags 5 and 7 may receive the interrogation signal 110 at a level sufficient to provide power to generate return signals 112. However, the placement/content of objects proximate to tags 5 and 7 and/or the portion 208 may prevent the RFID reader 102 from directly receiving these return signals from tags and 7, such as for instance, by blocking or attenuating these return signals 112. This may be particularly apparent for instance if the return signals 112 normally provided by tags 5 and 7 are weaker in strength relative to the interrogation signal 110 that may have been successfully received by tags 5 and 7.

The situation described above with respect to the pallet 200 can also be present in the pallet 202, if the RFID reader 102 attempts to read the tags 11-17 present therein. That is, the position/content of certain objects and of portion(s) of the pallet 2004 may prevent certain ones of the tags 11-17 from being effectively read directly by the RFID reader 102.

Furthermore, a situation may exist where the user of the RFID reader 102 is attempting to read only the tags 1-10 in the pallet 200, but due to poor focusing and/or due to the proximity of the pallet 202 near the pallet 200, some of the tags 11-17 in the pallet 202 may be unintentionally read by the RFID reader 102. In some circumstances, the information from the tags 11-17 in the pallet 202 may be irrelevant or otherwise undesirable to the user when reading the tags in the pallet 200.

Accordingly, one embodiment provides a technique that enables the RFID reader 102 to indirectly obtain information about certain tags that could not otherwise directly communicate with the RFID reader. Further, one embodiment enables the RFID reader 102 to process the information received from the read tags, and filter out irrelevant information (such as removing duplicate information, removing undesired information, and so forth). In such embodiments, obscured RFID tags receive sufficient power from the interrogation signal 110 and/or from signals provided by proximate RFID tags to enable the obscured RFID tags to generate return signals 112 (having information encoded therein that is resident in the obscured RFID tags and/or associative information that the obscured RFID tags might have received from other RFID tags) that can be received by the proximate RFID tags. These proximate RFID tags can then optionally store the received associated information, and provide the associated information directly to the RFID reader 102 and/or to other proximate RFID tags so that these other proximate RFID tags can provide that associated information directly to the RFID reader 102 and/or to yet other proximate RFID tags until the associated information is eventually provided to the RFID reader 102. In other words, an embodiment provides RFID tags and a corresponding technique wherein information from obscured RFID tags can be relayed or otherwise communicated from one tag to another, until the information is successfully read by the RFID reader 102, albeit indirectly.

In one embodiment, the pallet 200 may be provided with a structure 210 to facilitate communication of signals from one tag to another and/or between the RFID reader 102 and the various tags in the pallet 200. An example of the structure 200 is an antenna system, such as the example embodiments of an antenna system disclosed in U.S. patent application Ser. No. 11/404,510, entitled METHOD AND SYSTEM FOR READING OBJECTS HAVING RADIO FREQUENCY IDENTIFICATION (RFID) TAGS INSIDE ENCLOSURES, filed Apr. 14, 2006, assigned to the same assignee as the present application, and incorporated herein by reference in its entirety.

Figure 2:
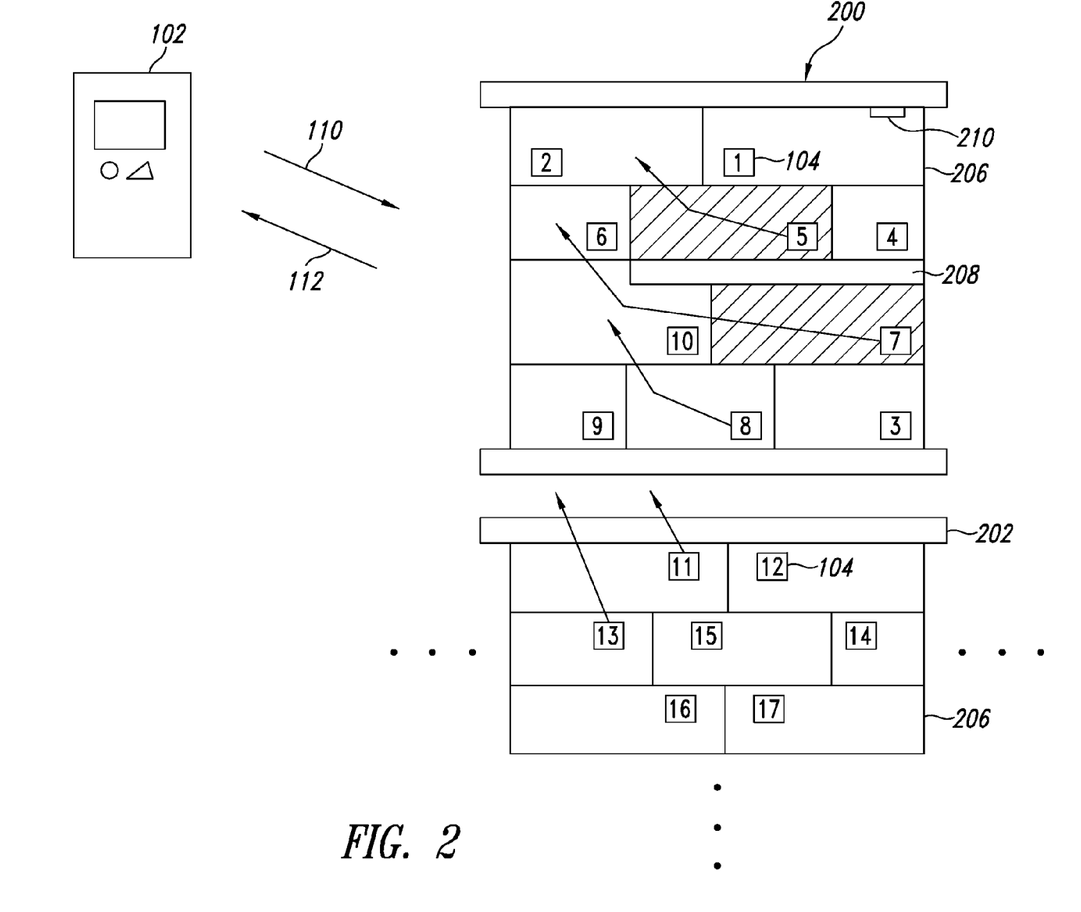
FIG. 2 is shows the RFID reader directly and indirectly reading multiple RFID tags that are present in first and second pallets according to an embodiment.
Figure 3:
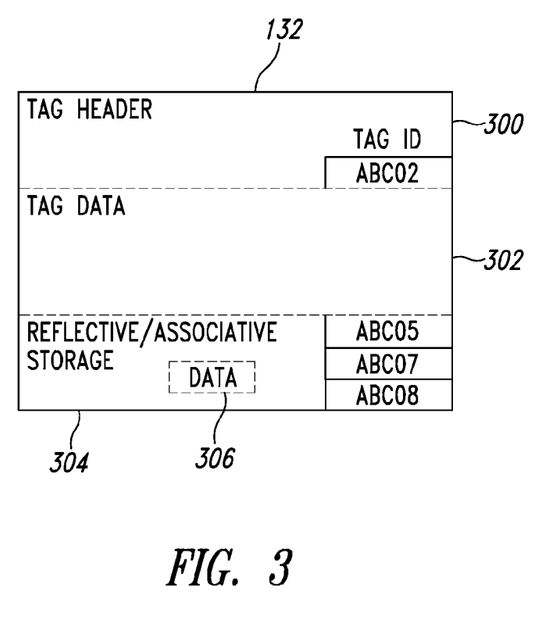
FIG. 3 is a representation of a storage unit in the RFID tag(s) of FIGS. 1-2 according to an embodiment.
Figure 4:
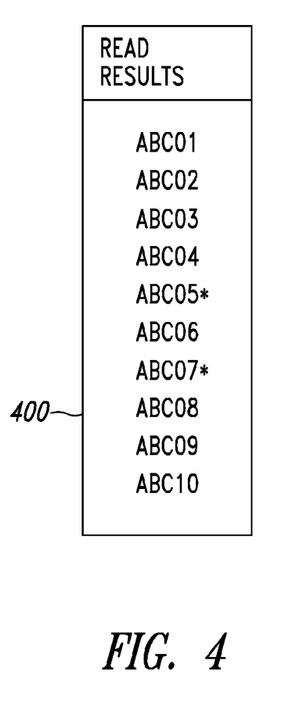
FIG. 4 shows example results obtained by the RFID reader after reading the RFID tags of FIG. 2 from the first pallet.

An example of this conveyance of associated RFID information is shown with respect to FIGS. 3 and 4, viewed in conjunction with the environment depicted in FIG. 2. In particular, FIG. 3 shows an example representation of the storage unit 132 of tag 2 (which can be directly read by the RFID reader 102) located in the pallet 200 according to one embodiment, and FIG. 4 shows the read results of the RFID reader 102 after reading the RFID tags in the pallet 200 and processing (such as removing duplicates) the information obtained from the reading. In this example embodiment, the relayed associative information is stored in the storage unit 132— again, it is noted other embodiments need not necessarily store the associative information.

In this example, an embodiment of the storage unit 132 of tag 2 includes a first storage area 300 to store header information for tag 2, such an ID code (e.g., "ABC02") that uniquely identifies tag 2 and/or other information pertaining to tag 2 that distinguishes tag 2 from other tags. The storage unit 132 of tag 2 also includes a second storage area 302 to store tag data (such as product information, manufacturer information, etc.) resident in tag 2 and pertaining to the item on which tag 2 is affixed.

The storage unit 132 of tag 2 still further includes a third storage area 304 to store information (associated with other tags) that has been received by tag 2. As one example, the third storage area 304 can store the ID codes (e.g., "ABC05" and "ABC07") that were encoded in the return signals 112 directly received by tag 2 from the obscured tags 5 and 7 (and/or indirectly received via other tags that had received these ID codes from the obscured tags 5 and 7). It is also possible, for example, for the ID code ABC05 to have been directly received by tag 2 from tag 5, while the ID code ABC07 was first received by tag 5 (and/or by some other tag) and then eventually relayed to tag 2.

As yet another example, the third storage area 304 may also store the ID code (e.g., "ABC08") of tag 8 that can be directly read by (e.g., is "visible to") the RFID reader 102—in such a situation, the return signal 112 (having the ID code ABC08 encoded therein) from tag 8 (and/or from other tags in communication with tag 8) was received by both the RFID reader 102 and by tag 2, thereby possibly resulting in the redundant presence of ABC08 in tag 2 and in the return signal received by RFID 102 from tag 8.

Alternatively or additionally to the ID codes, the third storage area 304 can also store tag data 306 (such as product/manufacturer information pertaining to the object having a tag affixed thereto) originally resident in and associated with other tags, such as tags 5, 7, and 8. Such tag data 306 would also have been encoded in the return signals 112 received by tag 2 directly from tags 5, 7, and 8 and/or were relayed indirectly to tag 2 via other tags from tags 5, 7, and 8.

In one embodiment, the third storage area 304 can be located in a different storage unit than the storage unit 132 that contains the ID code in the first storage area 300 and the tag data in the second storage area 302. In such an embodiment, the third storage area 304 can be part of a random access memory (RAM) or some other type of non-persistent storage device that loses its stored content after being powered off and/or after some amount of time. In this embodiment, the third storage area 304 can therefore continue to be written/erased (e.g., add and remove ID codes associated with other tags and/or with the same tags) repeatedly over time as the pallet 200 is interrogated by the RFID reader 102 and/or by other RFID readers, and/or as other objects and their tags are added to, removed from, or repositioned in the pallet 200.

In another embodiment, the third storage area 304 can be a part of persistent storage device, such as a read only memory (ROM), so that the associated information contained therein remains persistent even if the tag 2 is powered off. In yet other embodiments, the third storage area 304 (whether persistent or non-persistent) can be in the same storage unit 132 as the other storage areas 300 and 302.

As evident from the above description of FIG. 3, the RFID reader 102 may receive several return signals 112 from the various tags that are read from the pallet 200. Each of these return signals 112 can potentially have encoded therein not only the resident information (e.g., the ID code and tag data) pertaining to a particular tag being directly read, but also information associated with other tags that was received by that particular tag. Thus, given the arrangement of the various tags in the pallet 200 and based on the contents of the return signals 112 received by the RFID reader 102, the RFID reader 102 may receive duplicative information.

Accordingly, an embodiment of the RFID reader 102 filters out duplicative information. For example and as represented in FIG. 4, the read results 400 of the RFID reader 102, after having filtered out duplicates, has only single occurrences of each unique ID code of the tags present in the pallet 200.

In one embodiment to assist in filtering out duplicates, the associated information (e.g., the relayed information associated with other tags, other than the resident information pertaining to a particular tag that is directly read) might be identified by an asterisk (*) or other identification character(s) and/or identification format (such as different color, font, bold/underline/italic, etc.). Such identification might for example be added by the tag 2 to the ABC05, ABC07, and ABC08 ID codes that are stored in the third storage area 304, thereby yielding "flagged" ID codes in the form of ABC05*, ABC07*, and ABC08*, as examples. It is also possible in another embodiment for the RFID reader 102 to add these identification characters, such as if a protocol is implemented in which the information read from tag 2 during the first 10-20 milliseconds (or other time duration that may be longer or shorter) is the resident information of tag 2, while any associated information that is read after that time frame is deemed to be associative information and therefore appended with an asterisk or other distinguishing identification by the RFID reader 102.

The identification (alternatively or additionally to the example timing protocol described above) might also be in the form of a specific delimiter, which identifies the boundary between information resident in and pertaining to the tag 2 versus associative information relayed to and provided by tag 2. For example, if the information from tag 2 is being read in sequence as a serial bit stream, starting with the resident information of tag 2 followed by the associative information relayed to tag 2, a delimiter in the form of #### or other alphanumeric string can be used to delimit the boundary between the resident information and the associative information in the serial bit stream. Thus, upon detection of this alphanumeric (delimiter) string, the RFID reader 102 can append asterisks to any ID code received in the serial bit stream after the alphanumeric (delimiter) string, thereby identifying the associative information.

Accordingly and as an example, the information decoded by the RFID reader 102 from the received return signals 112 may have one occurrence of ABC02 (received directly from tag 2); possible multiple occurrences of ABC02* received from other tags that have been relayed with information from tag 2; possible multiple occurrences of ABC05* and ABC07* received from the various tags that have been relayed with information from the obscured tags 5 and 7; possible multiple occurrences of ABC08* obtained from tag 2 and other tags having the ID code of tag 8 relayed thereto; and singular occurrences of the other ID codes (e.g., ABC01) of non-obscured tags, as well as possible multiple ones of the flagged versions (e.g., ABC01*) of these ID codes.

An embodiment of the RFID reader 102 processes these flagged and non-flagged ID codes, so as to obtain the final read results 400 shown in FIG. 4 in which duplicates have been filtered out. For instance, if there is one occurrence of the unique ABC02 ID code and at least one occurrence of ABC02*, then this situation indicates to the RFID reader that (1) the tag 2 is present in the pallet 200 and was directly read, and (2) the flagged version (ABC02*) may be filtered out or otherwise disregarded since this flagged ID code was received from some other tag and is a duplicate that is referring to one and the same tag 2. The same situation applies to ABC08 and ABC08*of tag 8, which were directly and indirectly read by the RFID reader 102. In such cases, the read results 400 show non-flagged versions of ABC02 and ABC08 so that duplicate information is not presented.

In comparison, there may be single or multiple ones of the flagged code ABC07* and no corresponding non-flagged code ABC07, thereby indicating to the RFID reader 102 (and to its user) that tag 7 is being obscured. The read results 400 would thus show the flagged code ABC07*. Appropriate follow-up action can then be performed by the user upon viewing these read results 400, as will be explained later below, to obtain a better assessment of the nature of tag 7.

Figure 5:
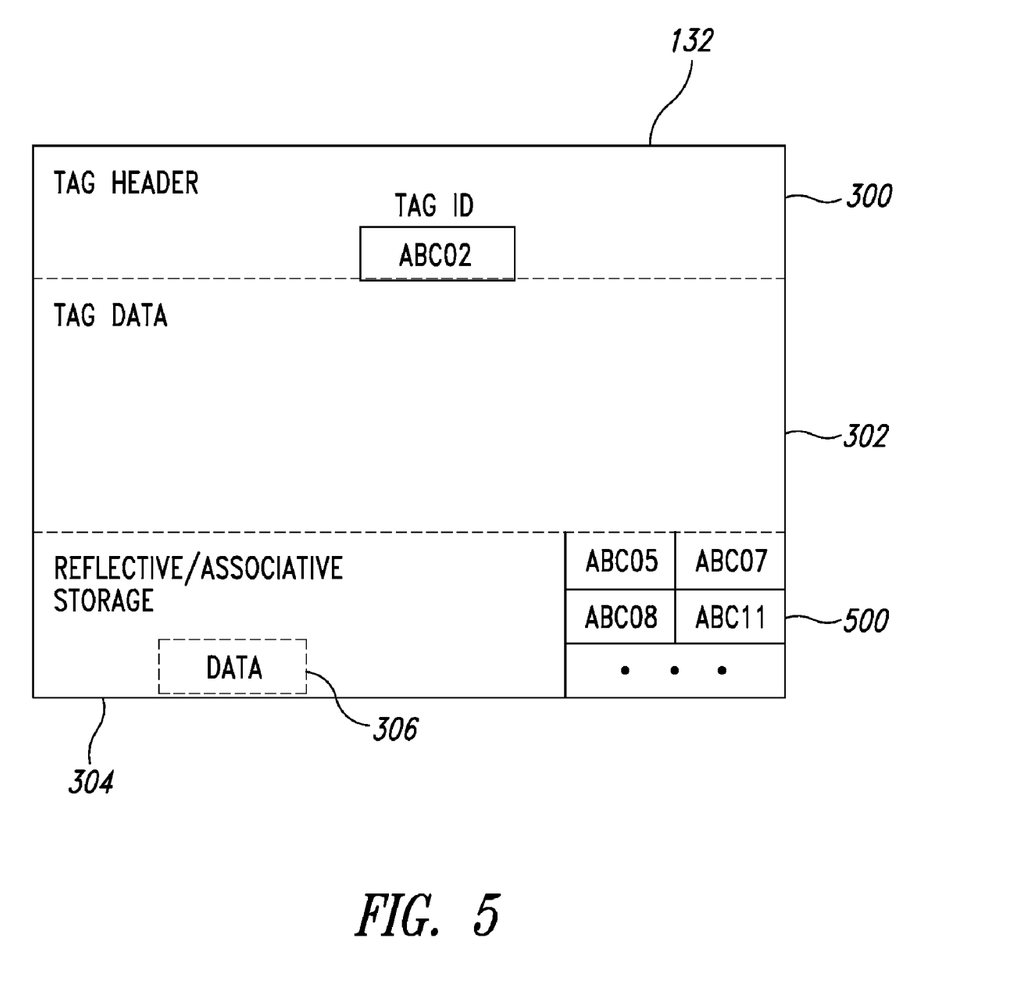
FIG. 5 is another representation of a storage unit in the RFID tag(s) of FIGS. 1-2 according to an embodiment.

FIG. 5 shows another embodiment of the third storage area 304 of the storage unit 132 (such as in tag 2) according to another embodiment. Specifically, the third storage area 304 of FIG. 5 not only stores the ID codes ABC05, ABC07, and ABC08 of respective tags 5, 7, and 8 in the pallet 200, but also stores the ID code ABC11 of tag 11 located in the proximate pallet 202 of FIG. 2. Thus, FIG. 5 depicts a situation where the ID codes or other information from one or more tags in the pallet 202 may have been transmitted to one or more tags in the pallet 200, in response to an attempt by the user of the RFID reader to interrogate only the tags in the pallet 200.

In such a situation, an embodiment provides a technique to identify which of the particular ID codes read by the RFID reader 102 belong to the pallet 200 and which likely or possibly belong to the pallet 202. The use of RFID tags 104 having capability to store and relay information (such as ID codes) associated with proximately located tags enables the RFID reader 102 to perform this identification, since such RFID tags serve as multiple sources of data that can be collectively evaluated to deduce a possible conclusion as to the relevancy of a particular tag.

For instance in one embodiment, the interrogation signal 110 from the RFID reader 102 directed towards the pallet 200 energizes some tags in the pallet 200 and possibly energizes some tags in the proximate pallet 202 as well. With regards to the pallet 200, the behavior of the tags contained therein in response to the interrogation signal 110 and the information received/processed by the RFID reader 102 have been described above with respect to FIGS. 2-4.

With regards to the tags in the pallet 202 that may have been energized by the interrogation signal 110 and/or by signals received from tags in the pallet 200, such tags in the pallet 202 may themselves generate their own return signals 112. In the example of FIG. 5, tag 11 in the pallet 202 has generated such a return signal 112, which has been received by only tag 2 and no other tags in the pallet 200. Hence, the third storage area 306 of tag 2 stores the ABC11 ID code of tag 11. Various other tags in the pallet 202 may also generate return signals 112 having encoded information that is propagated between the tags in the pallet 202 and/or to one or more tags in the pallet 200.

Figure 6:
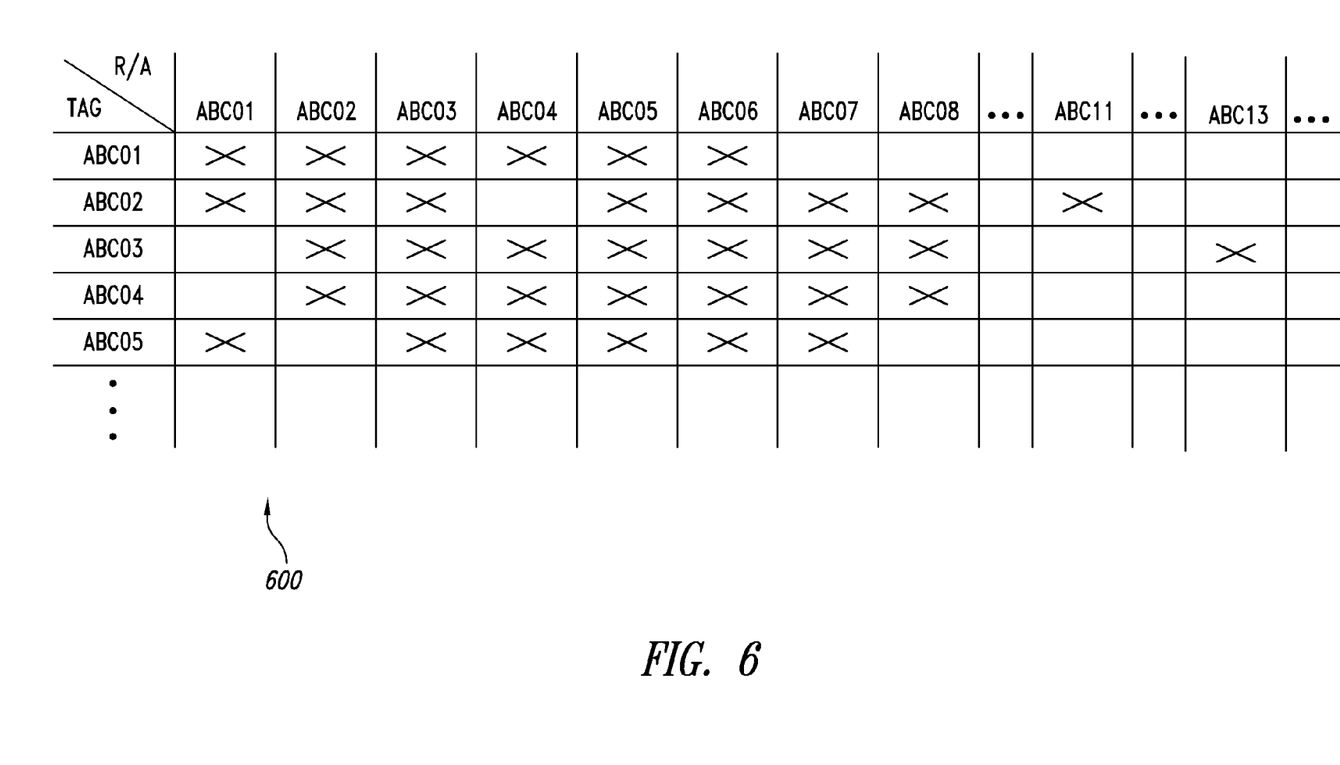
FIG. 6 shows other example results obtained by the RFID reader after reading the RFID tags of FIG. 2 from both the first and second pallets.

When the RFID reader 102 receives the return signals 112 from the tags in the pallet 200, the RFID reader 102 may filter duplicates, such as explained above. Then in one embodiment, the RFID reader 102 generates or otherwise populates a table 600 or other data structure such as represented in FIG.

6. The table 600 of one embodiment can be generated by the processor 114 and stored and maintained in the storage medium 116.

The table 600 of FIG. 6 has a vertical axis that lists all of the tags that were identified during the interrogation (with duplicates filtered out). The horizontal axis of the table 600 places an identifier (such as an "x") for each of the tags that are "visible" to each particular tag on the vertical axis (e.g., identifies each other tag for which the particular tag provided associative information in its return signal 112).

For example in FIG. 6, tag 2 has provided the ID codes for itself (ABC02), tag 1 (ABC01), tag 3 (ABC03), tag 5 (ABC05), tag 6 (ABC06), tag 7 (ABC07), tag 8 (ABC08), and tag 11 (ABC11). It is noted that in the table 600, tag 11 (ABC11) and tag 13 (ABC13) are "visible" only to tag 2 and tag 3, respectively, while the other tags are "visible" to multiple other tags.

According to one embodiment, the amount of "visibility" to other tags (e.g., whether such other tag or tags has provided information associated with a particular tag) determines whether the information of the particular tag is relevant to the read results of the RFID reader 102. For instance, the RFID reader 102 can be configured such that any tag that is "visible" to only one (1) other tag is deemed to be irrelevant to the read results. Thus, in the example of FIG. 6, the ABC11 and ABC13 ID codes are deemed to be irrelevant to the read results, since they are only visible to one other tag and are therefore concluded to be positioned in the pallet 202 rather than the pallet 200. Hence with an embodiment, the position/location of a particular tag (such as whether located in the pallet 200 or in the pallet 202) and hence the particular tag's relevancy to the read operation can be deduced.

The threshold value of one (1), representing the least number of communications with other tags, can of course vary from one implementation to another and may be configured by the user to any desired threshold value. For instance, threshold values of 2, 3, 5, or others may be configured. Alternatively or additionally to such threshold values, rules can be configured as to how certain results are to be interpreted and followed up. For instance, a tag that is visible to less than X other tags is deemed to be irrelevant; a tag visible to more than Y other tags are deemed to be relevant; and a tag visible to greater than X but less than Y other tags is deemed to be inconclusive and requiring further investigation or other additional follow-up action.

Thus from these embodiments, the relevancy of information that is read can thus be verified by using a plurality of information sources (e.g., tags) that are collectively examined.

In one embodiment, the various RFID tags and/or the information sent from one tag to another can be configured such that the number of communications/relays of a particular piece of information is limited to a specific number. For instance, the ID code ABC11 of tag 11 can be limited to one (1) relay, such that the code ABC11 is relayed once from tag 11 to tag 2 and is not thereafter further relayed from tag 2 to any other tags in the pallets 200 or 202. According to various embodiments, a flag or other suitable count indicator can be provided in the information (e.g., ABC11) that is updated (for instance by the controller 130 of receiving tag 2) after each occurrence of a relay, thereby indicating the number of relays that have been performed, so that the ID code ABC11 is not further relayed by tag 2 or any other tag after the specified number of relays has been used up. Each tag can be configured so that they do not accept (e.g., do not store and/or further relay) received information having the flag indicating that the number of relays has been used up. In this manner, the number of possibly misleading data in the table 600, indicating that a piece of information is visible to a large plurality of tags (due to repeated downstream relaying) rather actually visible to just one or a few tags, can be limited.

Figure 7:
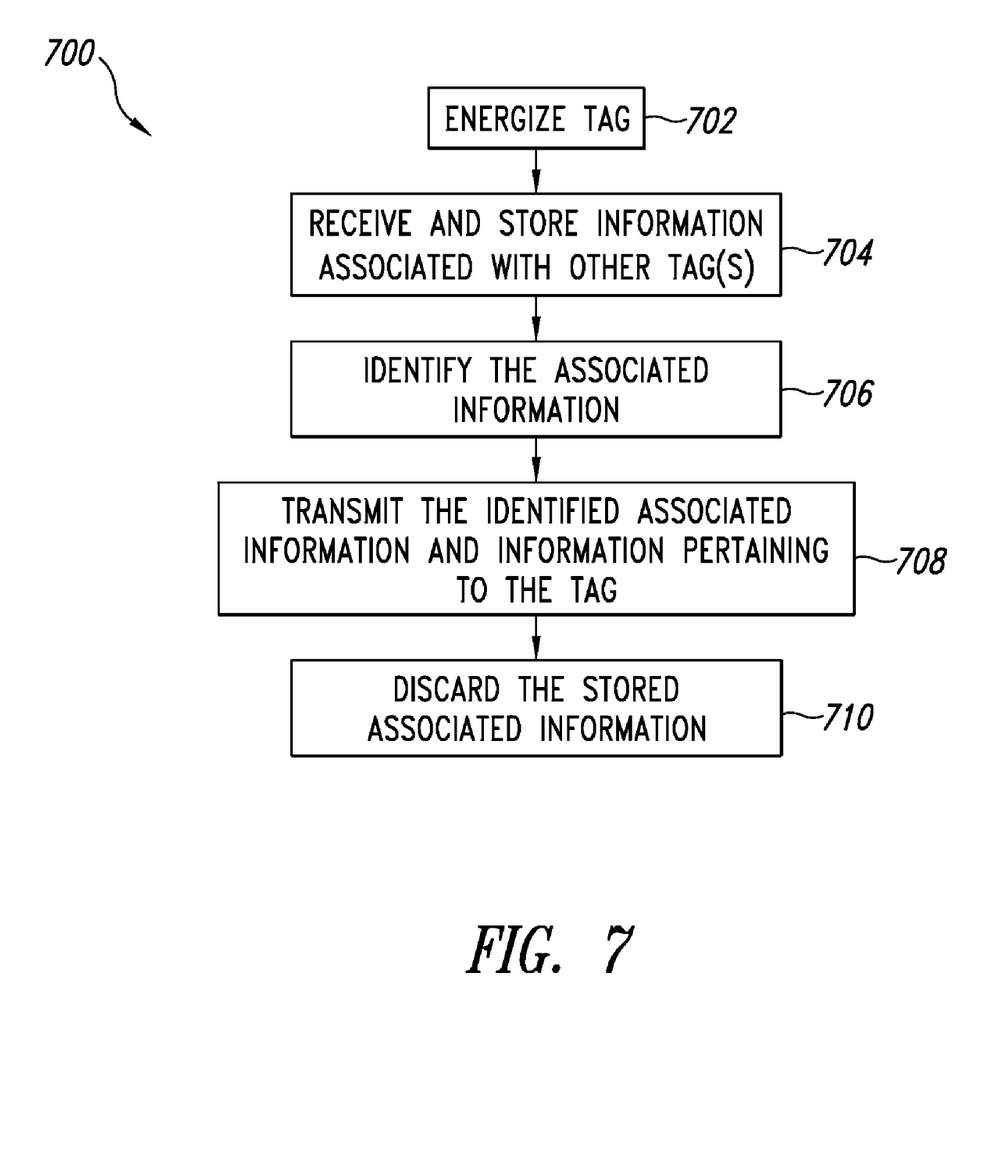
FIG. 7 is a flowchart depicting a method by an RFID tag to receive and transmit information associated with other RFID tags.

FIG. 7 is a flowchart of an embodiment of a method 700 that can be performed by the RFID tag 104 to receive and transmit information (such as ID codes and/or tag data) associated with other tags, as well as resident data. In one embodiment, one or more operations in the method 700 can be performed by software or other computer-readable instructions encoded in or otherwise stored in a computer-readable medium and executable by a processor. For instance, such operations may be embodied in instructions stored in the storage unit 132 and executed by the controller 130. In another embodiment, one or more operations in the method 700 can be performed by hardware singly or in combination with software or other computer-readable instructions executed by the controller 130.

The various operations depicted in FIG. 7 need not necessarily occur in the exact order shown. Moreover, various operations may be added, removed, combined, and/or modified.

At a block 702, a particular RFID tag 104 is energized. This energized tag can for example be tag 2 described above, which is in the field of view of the RFID reader 102 or otherwise able to receive (directly or indirectly) an energizing signal, and provide the return signal 112 directly or indirectly to the RFID reader 102. Tag 2 (if a passive tag) may be energized by the interrogation signal 110 from the RFID reader 102, by signal(s) provided by other tag(s), by a signal provided by the structure 210 (such as an antenna system), and/or a combination thereof. If tag 2 is an active tag, then the energizing at the block 702 can be provided by a dedicated battery or other power supply included in tag 2.

At a block 704, the energized tag 2 receives and stores information associated with other tag(s) that also may have been energized directly or indirectly by the RFID reader 102. For instance for the example described above, tag 2 receives the ID codes ABC05, ABC07, and ABC08 respectively associated with tags 5, 7, and 8 and which were encoded in the return signals 112 of these tags. Alternatively or additionally, other associative information for tags 5, 7, and 8 may be received and stored by tag 2 at the block 704, such as tag data (e.g., product description, manufacturer information, etc.) stored residently in and transmitted by tags 5, 7, and 8.

The antenna 126 and transmitter/receiver circuitry 128 of tag 2 may be used to receive the various signals at the blocks 702 and 704. The controller 130 and/or other components 136 can operate to decode or otherwise obtain the associated information encoded in the received return signals from other tags. The received associated information can be stored in the third storage area 304 of the storage unit 132 in the manner previously described and illustrated above. In another embodiment, the received associated information may be relayed subsequently to another destination without necessarily being stored intermediately in tag 2 at the block 704.

At a block 706, the controller 136 and/or other components 136 of tag 2 identifies the received associated information, so that this associated information can be distinguished from the resident information stored by tag 2 in the storage areas 300-302 that actually pertains to tag 2. For instance and as previously explained above, an asterisk or other identification can be added by tag 2 to the received ID codes of other tags.

At a block 708, tag 2 transmits (via encoding into the return signal 112) the associated information and the resident information pertaining to tag 2. In one embodiment, a single return signal 112 can be encoded with both the resident information and the associated information. In another embodiment, separate return signals 112 can be provided by the tag 2 for the resident information and the associated information. The transmitted return signal(s) 112 from tag 2 may be received directly by the RFID reader 102, for example if tag 2 is in the field of view (including range) of the RFID reader 102, and/or received indirectly by the RFID reader 102 via relaying of the information from one tag to another until received by the RFID reader 102.

At a block 710, the associated information stored by tag 2 is discarded. Discarding at the block 710 can occur for example after tag 2 is de-energized after a period of time, thereby clearing non-persistent storage areas of tag 2 of any information stored therein. Discarding can also occur if the storage area (such as the third storage area 304) is configured to be erased or otherwise cleared of its stored information after some period of time or in response to some condition. Discarding may also occur if previously stored associated information is overwritten by newly received associated information or "pushed out" if the storage area 304 is implemented as part of a first-in first-out (FIFO) memory.

Figure 8:
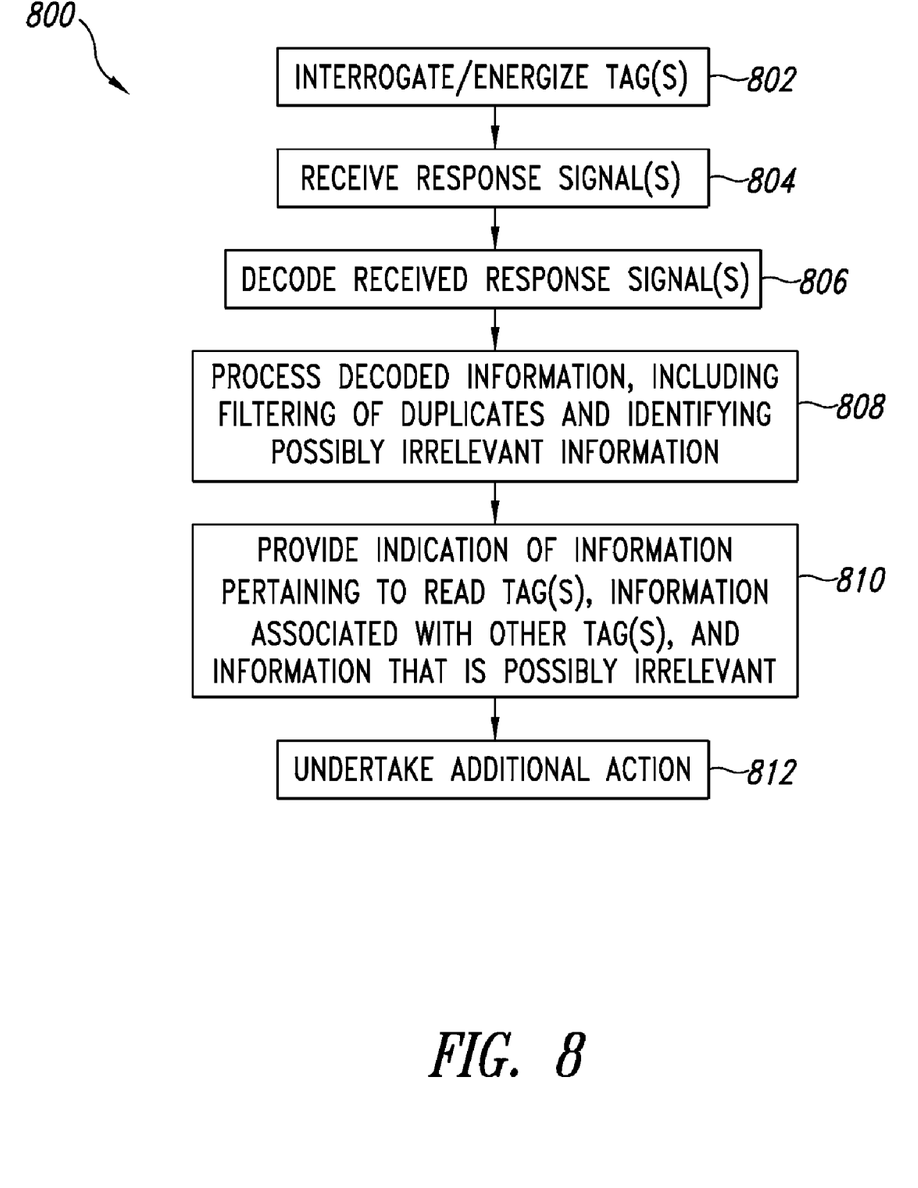
FIG. 8 is a flowchart depicting one embodiment of a method to read RFID tags and to interpret/process results of the read.

FIG. 8 is a flowchart of an embodiment of a method 800 that can be performed by the RFID reader 102 to read RFID tags and to interpret/process the results. In one embodiment, one or more operations in the method 800 can be performed by software or other computer-readable instructions encoded in or otherwise stored in a computer-readable medium and executed by a processor. For instance, such operations may be embodied in instructions stored in the storage medium 116 and executed by the processor 114. In another embodiment, one or more operations in the method 800 can be performed by hardware singly or in combination with software or other computer-readable instructions executed by the processor 114.

As with FIG. 7, the various operations depicted in FIG. 8 need not necessarily occur in the exact order shown. Moreover, various operations may be added, removed, combined, and/or modified.

At a block 802, the RFID reader 102 energizes or otherwise interrogates at least one RFID tag 104 using the interrogation signal 110, as sent by the antenna 106 and transmitter/receiver circuitry 108. Continuing with the example provided herein, the interrogation signal 110 might be received indirectly or directly by tag 2. In response to the interrogation signal 110, tag 2 (as well as other tags) performs the method 700 of FIG. 7.

At a block 804, the antenna 106 and transmitter/receiver circuitry 108 of the RFID reader 102 receives the return signal 112 from tag 2 (directly or indirectly) as well as possibly other return signals from other tags. These other return signals may originate from other tags in the same pallet 200 as tag 2 and/or from tags in the proximately located pallet 202.

At a block 806, the processor 114 and/or other components 122 decodes the information encoded in the received return signal(s) 112. In one embodiment, conventional techniques may be used to perform the decoding.

At a block 808, the processor 114 and/or other components 122 process the decoded information. As previously explained above, this processing can involve identifying and filtering duplicate information, identifying which information pertains to tag 2 and which information is associated with other tag(s), generating the read results 400 of FIG. 4, populating the table 600 of FIG. 6 to identify which tags are "visible" to other tags, identifying possibly irrelevant information (such as ID codes of tags that may be located in the proximate pallet 202) from the table 600, and/or other operations.

At a block 810, the user interface 120 of the RFID reader 102 can provide various indications to the user. Such indications can include, for example, a list of ID codes that were decoded (like the read results 400 of FIG. 4), wherein certain ones of the ID codes are identified by the user interface 120 as pertaining to tag 2 (e.g., ABC02) and/or pertaining to other tags (e.g., ABC01) that were directly read, associative information (e.g., ABC08\*) of tags that were read indirectly and are thus flagged, associative information (e.g., ABC11\*#) of other tags that were read indirectly (thus flagged with an asterisk or other identification) but were deemed to be possibly irrelevant to the read (and thus flagged with further identification, such as a # sign or other identification technique) since such tag(s) might be present in the other pallet 202. Various other indications may be provided to the user at the block 810, such as an error indication, a request/recommendation to repeat the interrogation or to perform other interrogations, a successful read indication, and so forth.

At a block 812, additional action can be taken by the user in response to the indications provided at the block 810. These additional actions can include but not be limited to:

repeating the interrogation if the read results 400 are not complete or are inconclusive, such as if some tags are missing from the read results 400;

update records appropriately if all tags have been read and identified successfully;

change interrogation settings, range and/or orientation, power output, etc. of the RFID reader 102 to obtain a more complete and accurate subsequent interrogation;

if the read results 400 provided only partial information from a particular tag, consult a database or other information source to look up the missing information;

combing results of multiple interrogations to arrive at a more accurate and complete determination of the position and/or relevancy of particular tags;

log the history and results of interrogations; and/or other additional action.

The above description of illustrated embodiments, including what is described in the Abstract, is not intended to be exhaustive or to be limited to the precise forms disclosed. While specific embodiments and examples are described herein for illustrative purposes, various equivalent modifications are possible and can be made.

For example, use of the table 600 has been described with reference to FIG. 6 for determining whether a particular tag is relevant to the interrogation. In other embodiments the table 600 or other data structure need not be used. Rather, an algorithmic approach can be used to deduce the relevancy of a particular tag, such as an algorithm that records/tracks the visibility of a particular tag and then makes a determination of the relevancy of that particular tag based on the number of other tags to which that particular tag is "visible."

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet, are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A radio frequency identification (RFID) system, comprising:
    an RFID reader adapted to provide an interrogation signal; and
    a plurality of RFID tags, at least a first of said RFID tags being positioned to receive said interrogation signal and being adapted to provide at least one first return signal in response to said interrogation signal, at least a second of said RFID tags being adapted to provide a second return signal, said second return signal being encoded with information, associated with said second RFID tag, that is provided to said first RFID tag, said at least one first return signal provided by said first RFID tag being encoded with information resident in said first RFID tag and with said provided information associated with said second RFID tag,
    wherein said RFID reader is adapted to decode said first return signal to obtain the resident information and associated information encoded therein, and adapted to process said decoded information to identify said second RFID tag as being positioned in indirect communication with said RFID reader, and wherein said associated information is distinguished from said resident information by an identification added to said associated information, said identification usable by said RFID reader to perform said identify of said second RFID tag as being in indirect communication with said RFID reader.

2. The system of claim 1 wherein said second RFID tag is positioned in indirect communication with said RFID reader due to at least one or more of: said second RFID tag being outside of a field of view of said interrogation signal, said interrogation signal being at least partially blocked from said second RFID tag, said second return signal having insufficient strength to reach said RFID reader, and said second return signal being at least partially blocked from said RFID reader.

3. The system of claim 1 wherein said first RFID tag is adapted to store said information associated with said second RFID tag.

4. The system of claim 1 wherein said RFID reader is adapted to filter out duplicate ones of said resident information and said associated information.

5. The system of claim 1 wherein said second return signal is provided by said second RFID tag to at least a third of said RFID tags, said third RFID tag being adapted to provide said associated information to said first RFID tag through a third return signal having said associated information encoded therein.

6. The system of claim 1 wherein said RFID reader is further adapted to determine, from information decoded by said RFID reader from a plurality of return signals provided by respective multiple ones of said RFID tags in response to said interrogation signal, which of said multiple ones of said RFID tags are relevant to a particular read operation and which of said multiple RFID tags are irrelevant to said read operation, said RFID tags determined to be irrelevant having a least number of communications with other RFID tags during said read operation.

7. A radio frequency identification (RFID) reader apparatus, comprising:
    an antenna and transceiver circuitry adapted to provide an interrogation signal to at least some of a plurality of RFID tags and adapted to receive respective return signals from responsive ones of said RFID tags, at least one of said return signals from each responsive RFID tag being encoded with first information pertaining to the respective responsive RFID tag and second information associated with at least one other responsive RFID tag;
    a decoder coupled to said transceiver circuitry to decode said first information and said second information from each at least one return signal; and
    a processor coupled to said decoder to process said decoded first information and said decoded second information to determine which of said plurality of RFID tags provided their respective at least one return signal directly to said antenna and which of said plurality of RFID tags provided their respective at least one return signal indirectly to said antenna via at least one other RFID tag, and wherein to determine which of said plurality of RFID tags provided their respective at least one return signal indirectly to said antenna, said processor is adapted to detect a flag in said decoded second information, said flag indicating that the RFID tag associated with the decoded second information is positioned in a location insufficient to permit the at least one return signal of that RFID tag to be received by said antenna.

8. The apparatus of claim 7 wherein said processor is further adapted to filter out duplicate ones of said decoded second information.

9. A radio frequency identification (RFID) reader apparatus, comprising:
    an antenna and transceiver circuitry adapted to provide an interrogation signal to at least some of a plurality of RFID tags and adapted to receive respective return signals from responsive ones of said RFID tags, at least one of said return signals from each responsive RFID tag being encoded with first information pertaining to the respective responsive RFID tag and second information associated with at least one other responsive RFID tag;
    a decoder coupled to said transceiver circuitry to decode said first information and said second information from each at least one return signal; and
    a processor coupled to said decoder to process said decoded first information and said decoded second information to determine which of said plurality of RFID tags provided their respective at least one return signal directly to said antenna and which of said plurality of RFID tags provided their respective at least one return signal indirectly to said antenna via at least one other RFID tag, and wherein said apparatus is further adapted to determine, collectively from all of said decoded second information, which of said plurality of RFID tags are relevant to a particular read operation and which of said plurality of RFID tags are irrelevant to said read operation, said RFID tags determined by said processor to be irrelevant having a least number of communications with other RFID tags during said read operation.

10. The apparatus of claim 9, further comprising a storage medium, coupled to said processor, to store a table adapted to be populated by said processor with indications of said communications between individual ones of the plurality of RFID tags.

11. A method for a radio frequency identification (RFID) tag, the method comprising:
    storing first information in said RFID tag, said first information pertaining to said RFID tag;

receiving by said RFID tag second information associated with another RFID tag that is unable to communicate said second information directly to an RFID reader;

encoding said first information and said second information in at least one return signal;

transmitting said at least one return signal having said first information and said second information encoded therein in response to an interrogation signal from said RFID reader; and adding an identification to said second information to indicate that said second information is associated with said another RFID tag rather than pertaining to said RFID tag.

12. The method of claim 11 wherein said at least one return signal is a single return signal having both the first information and the second information encoded therein.

13. The method of claim 11 wherein said at least one return signal are two return signals having the first information and the second information respectively encoded therein.

14. The method of claim 11, further comprising storing the received second information in said RFID tag.

15. A method for a radio frequency identification (RFID) reader, the method comprising:

providing an interrogation signal to at least some of a plurality of RFID tags;

in response to said provided interrogation signal, receiving respective return signals from energized ones of said RFID tags, at least one of said return signals from each energized RFID tag being encoded with first information pertaining to the respective energized RFID tag and second information associated with at least one other energized RFID tag;

decoding said first information and said second information from each at least one return signal; and processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag, wherein said determining which of said plurality of RFID tags provided their respective at least one return signal directly to said RFID reader includes detecting a flag in said decoded second information, said flag indicating that the RFID tag associated with the decoded second information is positioned in a location insufficient to permit the at least one return signal of that RFID tag to be received by said RFID reader.

16. The method of claim 15, further comprising filtering out duplicate ones of said decoded second information.

17. A method for a radio frequency identification (RFID) reader, the method comprising:

providing an interrogation signal to at least some of a plurality of RFID tags;

in response to said provided interrogation signal, receiving respective return signals from energized ones of said RFID tags, at least one of said return signals from each energized RFID tag being encoded with first information pertaining to the respective energized RFID tag and second information associated with at least one other energized RFID tag;

decoding said first information and said second information from each at least one return signal;

processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag; and determining, collectively from all of said decoded second information, which of said plurality of RFID tags are relevant to a particular read operation and which of said plurality of RFID tags are irrelevant to said read operation, said RFID tags determined to be irrelevant having a least number of communications with other RFID tags during said read operation.

18. An article of manufacture, comprising:

a non-transitory computer-readable medium, of a radio frequency identification (RFID) reader, encoded with computer-readable instructions that are executable by a processor of said RFID reader to communicate with a plurality of RFID tags, by:

providing an interrogation signal to at least some of said plurality of RFID tags;

in response to said provided interrogation signal, receiving respective return signals from energized ones of said RFID tags, at least one of said return signals from each energized RFID tag being encoded with first information pertaining to the respective energized RFID tag and second information associated with at least one other energized RFID tag;

decoding said first information and said second information from each at least one return signal; and processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag, wherein to determine which of said plurality of RFID tags provided their respective at least one return signal directly to said RFID reader, said instructions are executable by said processor to:

detect a flag in said decoded second information, said flag indicating that the RFID tag associated with the decoded second information is positioned in a location insufficient to permit the at least one return signal of that RFID tag to be received by said RFID reader.

19. The article of manufacture of claim 18 wherein said non-transitory computer-readable medium is further encoded with computer-readable instructions executable by said processor to:

filter out duplicate ones of said decoded second information.

20. An article of manufacture, comprising:

a non-transitory computer-readable medium, of a radio frequency identification (RFID) reader, encoded with computer-readable instructions that are executable by a processor of said RFID reader to communicate with a plurality of RFID tags, by:

providing an interrogation signal to at least some of said plurality of RFID tags;

in response to said provided interrogation signal, receiving respective return signals from energized ones of said RFID tags, at least one of said return signals from each energized RFID tag being encoded with first information pertaining to the respective energized RFID tag and second information associated with at least one other energized RFID tag;

decoding said first information and said second information from each at least one return signal; and processing said decoded first information and said decoded second information to determine which of said plurality of RFID tags provided their respective at least one return signal directly to said RFID reader and which of said plurality of RFID tags provided their respective at least one return signal indirectly to said RFID reader via at least one other RFID tag, and wherein said non-transitory computer-readable medium is further encoded with computer-readable instructions executable by said processor to:

determine, collectively from all of said decoded second information, which of said plurality of RFID tags are relevant to a particular read operation and which of said plurality of RFID tags are irrelevant to said read operation, said RFID tags determined to be irrelevant having a least number of communications with other RFID tags during said read operation.

* * * * *